(12) United States Patent
Tozawa (10) Patent No.: US 10,493,679 B2
(45) Date of Patent: Dec. 3, 2019

(54) MOLD ATTACHING METHOD TO MOLD CLAMPING DEVICE

(71) Applicant: NISSEI PLASTIC INDUSTRIAL CO., LTD., Hanishina-gun, Nagano-ken (JP)

(72) Inventor: Keiichi Tozawa, Hanishina-gun (JP)

(73) Assignee: NISSEI PLASTIC INDUSTRIAL CO., LTD., Hanishina-Gun, Nagano-Ken (JP)

( * ) Notice: Subject to any disclaimer, the term of this patent is extended or adjusted under 35 U.S.C. 154(b) by 519 days.

(21) Appl. No.: 14/688,174

(22) Filed: Apr. 16, 2015

(65) Prior Publication Data

US 2015/0298376 A1 Oct. 22, 2015

(30) Foreign Application Priority Data

Apr. 17, 2014 (JP) ................. 2014-085140

(51) Int. Cl.
*B29C 45/17* (2006.01)
*B29C 45/16* (2006.01)
(Continued)

(52) U.S. Cl.
CPC ...... *B29C 45/1756* (2013.01); *B29C 45/1615* (2013.01); *B29C 45/1742* (2013.01); *B29C 45/7653* (2013.01); *B29L 2031/757* (2013.01)

(58) Field of Classification Search
CPC ....... B29C 45/80; B29C 45/76; B29C 45/768; B29C 45/77; B29C 45/7653;
(Continued)

(56) References Cited

U.S. PATENT DOCUMENTS 5,540,577 A * 7/1996 Ishikawa ............... B29C 45/762
264/40.5
2003/0075818 A1* 4/2003 Morwald ............... B29C 45/76
264/40.1

(Continued)

FOREIGN PATENT DOCUMENTS

JP 5-185341 A 7/1993
JP 2009160771 A * 7/2009
(Continued)

OTHER PUBLICATIONS

Translation of JP 2013188998 A.*

*Primary Examiner* — Leith S Shafi
(74) *Attorney, Agent, or Firm* — Birch, Stewart, Kolasch & Birch, LLP (57) ABSTRACT

When a plurality of sets of molds, spaced a predetermined distance along a circumferential direction of a rotary platen, are attached through predetermined clamp portions to a mold attachment surface of the rotary platen supported by a movable platen included in a mold clamping device and a mold attachment surface of a fixed platen opposite this mold attachment surface, at least a mold clamping force, when the mold is attached, is previously limited to a limited mold clamping force lower than a mold clamping force at the time of molding. A mold attaching mode is set that has an interlock function of preventing the limitation from being cancelled until a condition under which all the clamp portions are turned on is satisfied. The selected mold attaching mode is performed when the molds are attached and the plurality of sets of molds are sequentially attached set by set.

14 Claims, 6 Drawing Sheets

(51) Int. Cl.
*B29C 45/76* (2006.01)
*B29L 31/00* (2006.01)

(58) Field of Classification Search
CPC ................................................................ B29C
2945/76645; B29C 2945/76096; B29C
2945/76384; B29C 2945/76408; B29C
2945/76013; B29C 2945/76481; B29C
2945/76869; B29C 2945/76933; B29C
2945/76234; B29C 2945/76391; B29C
45/1742; B29C 45/1756; B29C 45/1615;
B29L 2031/757
See application file for complete search history.

(56) References Cited

U.S. PATENT DOCUMENTS

2005/0226958 A1* 10/2005 Tsuji .................. B29C 45/7653
425/595
2008/0206382 A1* 8/2008 Yokoyama ........... B22D 17/266
425/135
2010/0013583 A1 1/2010 Kimura

FOREIGN PATENT DOCUMENTS

| JP | 2013-188998 A | | 9/2013 |
|----|---------------|---|--------|
| JP | 2013188998 A | * | 9/2013 |
| WO | 2008/105034 A1 | | 9/2008 |

* cited by examiner

MOLD ATTACHING METHOD TO MOLD CLAMPING DEVICE

TECHNICAL FIELD

This invention relates to a mold attaching method to a mold clamping device that is preferably used when a plurality of molds are attached to the mold clamping device in a multi-color molding injection molding machine or the like.

BACKGROUND ART

In general, molds included in an injection molding machine, are formed with a movable mold and a fixed mold, and they are supported by a mold clamping device. The mold clamping device includes a fixed platen whose position is fixed and a movable platen whose position is varied, and the fixed mold and the movable mold are respectively attached to the fixed platen and the movable platen with a predetermined clamp portion. Incidentally, although a bolt and nut is widely known as the clamp portion, an attaching operation (clamp operation) is complicated, and thus it is a disadvantage because of which it is not easy to be able to achieve automation. Hence, a clamp portion, apart from the bolt and nut that facilitates the automation of the clamp operation, is also practically used.

Conventionally, as the above-described clamp portion that facilitates the automation, a fluid pressure clamp disclosed in patent literature 1 and a magnetic fixing device disclosed in patent literature 2 are known. However, in the conventional clamp portion that does not use the bolt and nut, although it is easy to switch between a clamp state (ON) and a clamp cancellation state (OFF) with a button operation, the mold attachment surfaces of a movable platen and a fixed platen are perpendicular surfaces (vertical surfaces), and in the case of a multi-color molding injection molding machine that sequentially switches a plurality of sets of molds to perform molding, it cannot necessarily be said that the attaching operation is facilitated. In other words, when the bolt and nut is manually operated to adjust the position of the mold, the bolt and nut is loosened sensuously by an operator such that the mold is prevented from being dropped, and in such a state, it is possible to finely adjust the position, whereas when the clamping is performed with the clamp portion that does not use the bolt and nut, it is possible to easily perform the clamp operation itself but it is impossible to easily adjust the position of the mold.

On the other hand, a mold clamping method that can easily and reliably clamp and locate a mold and, in particular, is preferably used when a plurality of molds included in a multi-color molding injection molding machine, or the like, are attached to a mold clamping device, is also known. In this clamping method, the following steps are provided: a first step in which a movable platen is brought into a mold open state and a clamper is brought into a clamp cancellation state, the mold is fitted between mold attachment surfaces, the movable platen is moved to a mold clamping position and thereafter all clampers are switched to a clamp state; a second step in which the movable platen is brought into the mold open state and thereafter a rotary platen is rotated to switch the position of a movable mold; a third step in which when the movable platen is moved in a mold closing direction and reaches a previously-set predetermined cancellation setting position, a clamper, in one of the movable mold and a fixed mold opposite each other, is switched to the clamp cancellation state; and a fourth step in which the movable platen is moved to the mold clamping position and thereafter the clamper that has been brought into the clamp cancellation state in the third step is switched to the clamp state.

SUMMARY OF INVENTION

Technical Problem

However, in the above-described clamping method (mold attaching method) disclosed in patent literature 3, the following problems are not solved yet.

Firstly, when the molds are attached, it is assumed that two sets (in general, a plurality of sets) of molds are simultaneously transported into the mold clamping device. Hence, this causes a non-negligible increase in costs related to facilities because, for example, it is necessary to provide a large-sized crane that has a special structure for holding the two sets of molds and for simultaneously supporting the two sets of molds. Moreover, since in a general clamp portion using the bolt and nut, it is necessary to perform an individual operation of clamping the bolt and nut for each mold and the like, the method of simultaneously transporting the two sets of molds thereinto is not necessarily a preferable method, with the result that the method of simultaneously transporting the two sets of molds into the mold clamping device is disadvantageous with respect to general versatility.

Secondly, as one of the reasons the two sets of molds are simultaneously transported is because, in a state where all of a plurality of molds are not attached, an unbalance in mold clamping force is produced, and thus it is impossible to perform accurate mold thickness reading or the like. In addition, in general, the mold has a significant weight, and the weight of a large-sized mold may exceed 600 t. On the other hand, in patent literature 3, in a case where the general clamp portion using the bolt and nut is used which includes a period of time during which the clamping is temporarily cancelled, for adjusting the position of the mold, when the second mold is attached, there is, for example, a step of supporting the first mold with the first mold cantilevered, and thus the operation of attaching the second mold in a state where the first mold is not completely attached becomes a factor of anxiety for the operator and furthermore becomes a factor for reducing workability. As a result, it is difficult to adopt a method of attaching the molds set by set.

An objective of this invention is to provide a mold attaching method to a mold clamping device that solves the problems present in the background art described above.

Solution to Problem

In order to solve the problems described above, a mold attaching method to a mold clamping device according to this invention in which, a plurality of sets of molds spaced a predetermined distance along a circumferential direction of a rotary platen, are attached through predetermined clamp portions to a mold attachment surface of the rotary platen, supported by a movable platen included in the mold clamping device, and a mold attachment surface of a fixed platen opposite to this mold attachment surface, where at least a mold clamping force when the mold is attached is previously limited to a limited mold clamping force lower than a mold clamping force at a time of molding, a mold attaching mode is set that has an interlock function of preventing the limitation from being cancelled until a condition under which all the clamp portions are turned on is satisfied, the selected mold attaching mode is performed, when the mold is attached and the plurality of sets of molds are sequentially attached set by set.

Advantageous Effects of Invention

The mold attaching method to the mold clamping device $1c$ according to this invention produces the following significant effects.

(1) Since the mold clamping force when the mold is attached and clamped is limited to the limited mold clamping force lower than the mold clamping force at the time of molding, even when an unbalance is produced in the mold clamping force in a state where all of a plurality of sets of the molds are not attached, it is possible to remove the application of unnecessary stress to the molds and the mold clamping device, and it is possible to prevent the breakage or damage of the molds and the mold clamping device. Consequently, a plurality of sets of the molds can be attached set by set, and thus it is not necessary to provide a large-sized crane or the like having a special structure for supporting a plurality of sets, with the result that it is possible to significantly reduce costs related to facilities.

(2) Since at least, the mold clamping force when the mold is attached is limited to the limited mold clamping force, and the mold attaching mode is set that has the interlock function of preventing the limitation from being cancelled until the condition under which, all the clamp portions are turned on, are satisfied, even when a plurality of sets of the molds are attached set by set, it is possible to reliably remove a failure in which a high-pressure mold clamping force is applied by a normal operation or erroneously, and it is possible to remove a factor of anxiety for the user (operator) and smoothly and reliably perform the mold attaching, the position adjustment and the like, with the result that it is possible to facilitate the enhancement of the workability and the enhancement of the operation efficiency.

(3) In the preferred embodiment, the limited mold clamping force Pcp is set to fall within a range of 5 to 25% of the maximum mold clamping force Pmax in the mold clamping device $1c$, and thus the mold can be clamped with a pressurization force sufficiently lower than the maximum mold clamping force Pmax (100% output), with the result that the effect of reducing the application of excessive stress on the molds Ca and Cb and the mold clamping device $1c$ and furthermore, the effect of preventing the damage of the molds Ca and Cb and the mold clamping device $1c$ can be made more effective and reliable.

(4) In the preferred embodiment, the interlock function Fi is cancelled on condition that in the mold attaching mode Mc, the number of all the clamp portions $5ma$, $5mb$, $5ca$ and $5cb$ is previously set at the setting value St, the number of the clamp portions $5ma$, $5mb$, $5ca$ and $5cb$ that are turned on when the mold is attached, and is counted and the count value Sc counted reaches the setting value St, and it can be utilized as the most reliable information indicating that all the molds Ca and Cb are securely fixed, with the result that the effectiveness and the reliability of the interlock function Fi can be more enhanced. In addition, when the interlock function Fi is not cancelled though a series of attaching steps are completed, since a failure or the like may have occurred, it can be utilized as error information.

(5) In the preferred embodiment, in the mold attaching mode Mc, the mask processing is performed on the key display for performing the high-pressure mold clamping displayed on the operation screen of the display 11 additionally provided in the molding machine controller 10 which drives and controls the mold clamping device $1c$, and thus, the user (operator) can easily know that the high-pressure mold clamping is limited and can prohibit the high-pressure mold clamping from the side surface of the operation, with the result that it is possible to achieve a function as a so-called double limitation means for limiting the occurrence of a high-pressure mold clamping force.

(6) In the preferred embodiment, as the clamp portions $5ma$, $5mb$, $5ca$ and $5cb$, one of an electromagnetic clamper, a hydraulic clamper and an air clamper is used, and thus the mold attaching method according to this invention is applied to even the clamp portions $5ma$, $5mb$, $5ca$ and $5cb$ that can be switched on or off by the switch operation or the like and that cannot easily perform position adjustment or the like, with the result that it is possible to further enhance safety and workability when the mold is attached.

(7) In the preferred embodiment, when a bolt and nut is used as the clamp portions $5ma$, $5mb$, $5ca$ and $5cb$, even with the bolt and nut particularly involving a relatively large amount of manual operation, the user (operator) can reliably perform the operation of clamping the bolt and nut on the molds Ca and Cb, the operation of performing the position adjustment and the like, with the result that it is possible to facilitate the enhancement of the workability.

(8) In the preferred embodiment, the molds Ca and Cb include at least the mold in the multi-color molding injection molding machine 1, and thus it is possible to achieve the optimum performance given by the use of the mold attaching method according to this invention.

BRIEF DESCRIPTION OF DRAWINGS

FIG. 6($a$): A state diagram of a mold clamping device and the mold when the mold attaching method is performed;

FIG. 6($b$): Another state diagram of the mold clamping device and the mold when the mold attaching method is performed;

FIG. 6($c$): Another state diagram of the mold clamping device and the mold when the mold attaching method is performed;

FIG. 7($d$): Another state diagram of the mold clamping device and the mold when the mold attaching method is performed;

FIG. 7($e$): Another state diagram of the mold clamping device and the mold when the mold attaching method is performed; and FIG. 7($f$): Another state diagram of the mold clamping device and the mold when the mold attaching method is performed.

DESCRIPTION OF EMBODIMENTS

A preferred embodiment according to this invention will then be described in detail with reference to drawings. The accompanying drawings are not intended to specify this invention but are intended to facilitate the understanding of this invention. Detailed description of known parts will be omitted so that the invention is prevented from being unclear.

A schematic configuration of a two-color molding injection molding machine 1 in which a mold attaching method according to this embodiment is preferably used will first be described with reference to FIGS. 4 and 5.

Figure 4:
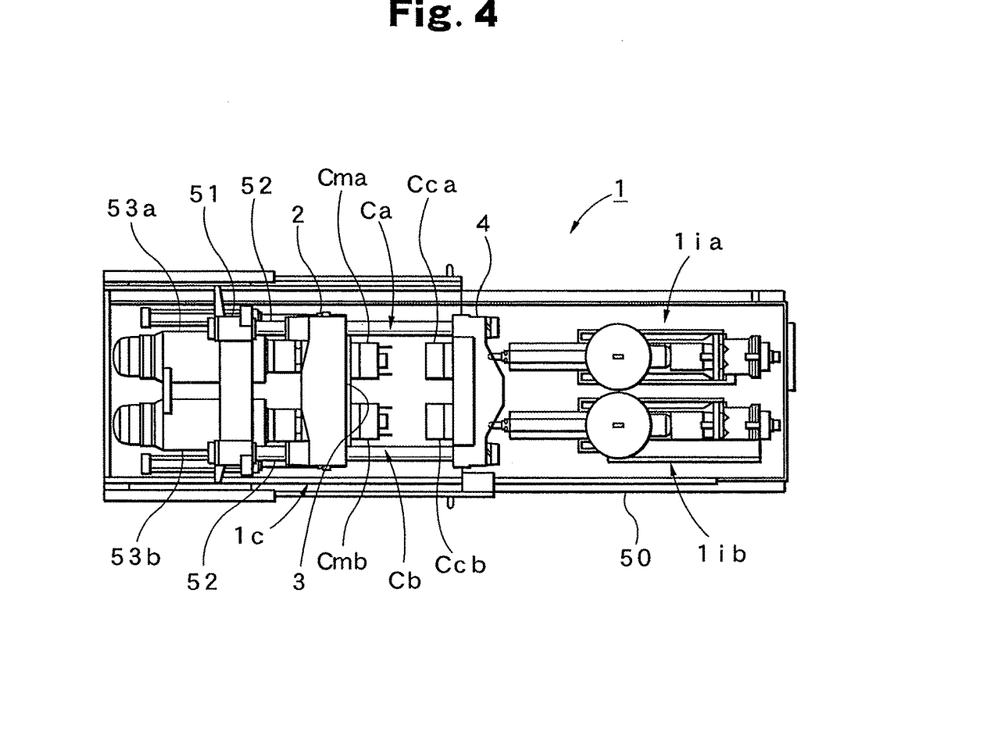
FIG. 4: A plan view showing an overall external configuration of a two-color molding injection molding machine that can perform the mold attaching method.

As shown in FIG. 4, the two-color molding injection molding machine 1 includes a mold clamping device 1c that is placed on a machine base 50 and injection devices 1ia and 1ib that are placed so as to be aligned from left to right. FIG. 4 shows an external appearance of the injection molding machine 1 in plan view. The mold clamping device 1c includes a fixed platen 4 that is fixed in the middle of the machine base 50, a support platen 51 that is fixed at an end portion of the machine base 50, four tie bars 52 that are placed between the support platen 51 and the fixed platen 4 and a movable platen 2 that is slidably fitted to the tie bars 52. The tie bars 52 are provided in the four corners of the movable platen 2 (the support platen 51 and the fixed platen 4). On the other hand, on the back surface of the support platen 51, mold clamping cylinders 53a and 53b are arranged. In this case, the mold clamping cylinder 53a is arranged so as to correspond to the position of a mold Ca on the primary side, which will be described later, and the mold clamping cylinder 53b is arranged so as to correspond to the position of a mold Cb on the secondary side, which will be described later. The top ends of the unillustrated piston rods of the mold clamping cylinders 53a and 53b are coupled to the movable platen 2, and the mold clamping cylinders 53a and 53b are connected to a hydraulic circuit 34, which will be described later.

Figure 5:
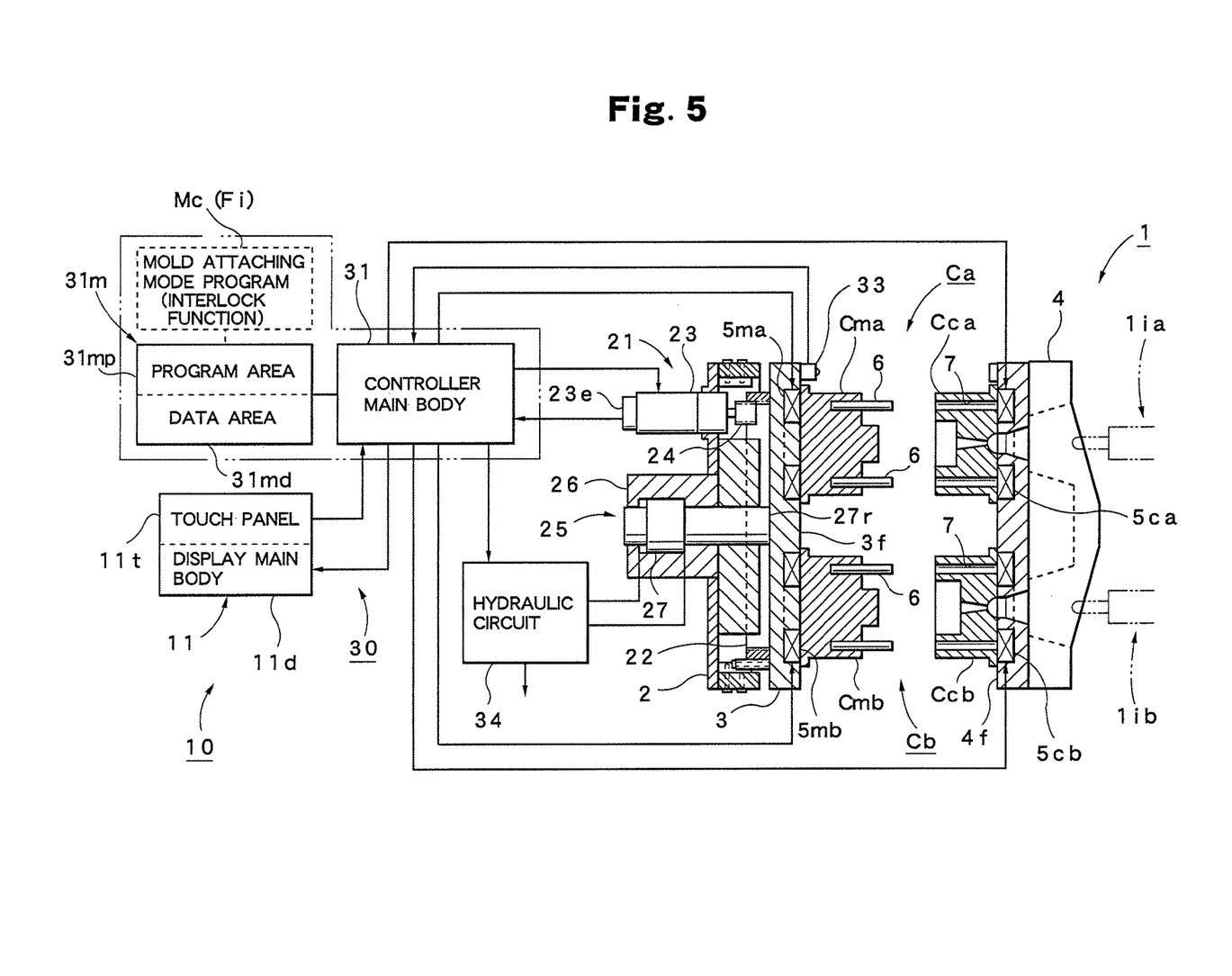
FIG. 5: A configuration diagram of a main portion of the two-color molding injection molding machine that can perform the mold attaching method.

As shown in FIG. 5, on the front surface (inner surface) of the movable platen 2, a rotary platen 3 is arranged so as to be overlaid, and on the back surface (outer surface) of the movable platen 2, a rotary platen rotation drive portion 21 that rotates the rotary platen 3 is arranged. The rotary platen rotation drive portion 21 includes ring gears 22 that are coaxially fixed to the rear surface of the rotary platen 3, a servo motor 23 that is attached to the back surface of the movable platen 2 and a drive gear 24 that is attached to the rotation shaft of the servo motor 23; this drive gear 24 engages with a screw portion formed on the inner circumference surface of the ring gears 22. On the other hand, in the center position of the back surface of the movable platen 2, a rotary platen proceeding/retreating drive portion 25 is arranged that slightly pushes out the rotary platen 3 in the axial direction to separate it from the movable platen 2 and that retreats in the axial direction to bring it into contact with the movable platen 2. The rotary platen proceeding/retreating drive portion 25 includes a proceeding/retreating cylinder 26 that is fixed on the back surface of the movable platen 2, the piston rod 27r of a piston 27 incorporated in the proceeding/retreating cylinder 26 is inserted into and passed through the movable platen 2 and its top end is fixed to the rear surface of the rotary platen 3. Hence, the piston rod 27r also serves as the rotation shaft of the rotary platen 3. The back and front chambers of the proceeding/retreating cylinder 26 are connected to the hydraulic circuit 34, which will be described later. The rotation range of the rotary platen 3 is restricted to 180° by a predetermined stopper means.

On the one hand, as shown in FIG. 5, on the mold attachment surface 3f of the rotary platen 3, a clamp portion 5ma that uses an electromagnetic clamper capable of clamping a movable mold Cma on the primary side is arranged, and a clamp portion 5mb that uses an electromagnetic clamper capable of clamping a movable mold Cmb on the secondary side is arranged. On the other hand, on the mold attachment surface 4f of the fixed platen 4, a clamp portion 5ca that uses an electromagnetic clamper capable of clamping a fixed mold Cca on the primary side is arranged, and a clamp portion 5cb that uses an electromagnetic clamper capable of clamping a fixed mold Ccb on the secondary side is arranged. The clamp portions 5ma, 5mb, 5ca and Scb are connected to the output port of a drive circuit incorporated in a controller main body 31. Hence, power is supplied to the clamp portions 5ma, 5mb, 5ca and 5cb, and thus the clamp portions 5ma, 5mb, 5ca and 5cb are turned on, and are brought into a clamp state. Since the clamp portions 5ma, 5mb, 5ca and 5cb in the clamp state become a powerful electromagnet, they suck (adsorb) and clamp the movable molds Cma and Cmb and the fixed molds Cca and Ccb. The power supply to the clamp portions 5ma, 5mb, 5ca and 5cb is cancelled (including demagnetization), and thus the clamp portions 5ma, 5mb, 5ca and 5cb are turned off, and are brought into a clamp cancellation state.

Although the electromagnetic clamper is illustrated as the clamp portions 5ma, 5mb, 5ca and 5cb, a hydraulic clamper or an air clamper may be used instead. In each of them, the turning on and off of the clamping can be switched by a switch operation or the like. The mold attaching method according to this invention is applied to even the clamp portions 5ma, 5mb, 5ca and 5cb that can be switched on or off by the switch operation or the like and that cannot easily perform position adjustment or the like, and thus it is possible to more enhance safety and workability when the mold is attached. On the other hand, as the clamp portions 5ma, 5mb, 5ca and Scb, the bolt and nut may be used. When the bolt and nut described above is used, even with the bolt and nut particularly involving a relatively large amount of manual operation, the user (operator) can reliably perform the operation of clamping the bolt and nut on the molds Ca and Cb, the operation of performing the position adjustment and the like, with the result that it is possible to facilitate the enhancement of the workability.

In this way, a pair of the movable molds Cma and Cmb can be attached to the positions opposite each other at an angle of 180° with respect to the center on the mold attachment surface 3f of the rotary platen 3, and a pair of the fixed molds Cca and Ccb can be attached to the positions opposite the movable molds Cma and Cmb on the mold attachment surface 4f of the fixed platen 4. In this case, the movable mold Cma and the fixed mold Cca basically form the mold Ca on the primary side, and the movable mold Cmb and the fixed mold Ccb basically form the mold Cb on the secondary side. At the time of use, the rotary platen 3 is rotated 180°, and thus the movable mold Cma on the primary side and the fixed mold Ccb on the secondary side are combined to allow molding on the secondary side, and the movable mold Cmb on the secondary side and the fixed mold Cca on the primary side are combined to allow molding on the primary side.

Each of the movable molds Cma and Cmb includes four locating pins 6, and each of the fixed molds Cca and Ccb includes locating insertion holes 7 into which the locating pins 6 are inserted. In this way, when the mold is closed (when the mold is clamped), the locating pins 6 enter the locating insertion holes 7, and thus the movable molds Cam and Cbm and the fixed molds Cac and Cbc are located. In this case, the top ends of the locating pins 6 and/or the open ends of the locating insertion holes 7 are tapered such that the locating pins 6 are easily inserted into the locating insertion holes 7. As described above, a plurality of locating pins 6 are provided in one of the movable molds Cma and Cmb and the fixed molds Cca and Ccb forming the molds Ca and Cb, and a plurality of locating insertion holes 7 into which the locating pins 6 are inserted are provided in the other, and especially when the mold attachment surfaces $3f$ and $4f$ of the rotary platen 3 and the fixed platen 4 are perpendicular surfaces (vertical surfaces), it is possible to reliably and smoothly perform the mold attaching method according to this invention without encountering a failure such as the dropping of the molds Ca and Cb.

Hence, with the two-color molding injection molding machine 1 having the configuration described above, at the time of molding, resins are injected into the clamped molds Ca and Cb, and the molds Ca and Cb are filled with the resins. Here, the first resin is injected from the injection device $1ia$ on the primary side into the mold Ca on the primary side, and the mold Ca is filled with the first resin, and the second resin is injected from the injection device $1ib$ on the secondary side into the mold Cb on the secondary side, and the mold Cb is filled with the second resin. After the completion of the injection and filling (injection step), the movable platen 2 is retreated and moved, and the mold is opened. Here, since the solidified molded items are adhered to the movable molds Cma and Cmb, cutting processing is performed on the primary molded item in the movable mold Cma on the primary side, and protrusion processing using an ejector is performed on the secondary molded item (two-color molded item) in the movable mold Cmb on the secondary side. Thereafter, the rotary platen 3 is pushed out in the axial direction by the proceeding/retreating cylinder 26, is further rotated 180° by the servo motor 23 and is then drawn in by the proceeding/retreating cylinder 26. Consequently, the empty movable mold Cmb on the secondary side is moved to the primary side, and the movable mold Cma on the primary side to which the primary molded item is adhered is moved to the secondary side. Thereafter, the same processing (processing) is repeatedly performed.

The configuration of a molding machine controller that performs the mold attaching method according to this embodiment will then be described with reference to FIG. 5.

In FIG. 5, reference sign 10 represents the molding machine controller, and in its main portion a controller main body 31 is included. The controller main body 31 incorporates a servo circuit that drives the servo motor 23, and the servo motor 23 is connected to the output portion of the servo circuit. At the back end of the servo motor 23, a rotary encoder $23e$ that detects the number of revolutions of the servo motor 23 is additionally provided, and the rotary encoder $23e$ is connected to the controller main body 31.

Reference sign 34 represents the hydraulic circuit (hydraulic drive portion), and is connected to the controller main body 31 described above. In this way, the hydraulic circuit 34 is controlled by the controller main body 31. Reference sign 11 represents a touch panel-type display that is connected to the controller main body 31, and various types of displays can be performed by a display main body $11d$, and various types of settings and the like can also be made by an input portion using a touch panel $11t$. Reference sign 33 represents a mold position sensor that is attached to the rotary platen 3 to detect the position of the rotary platen 3 (including the movable platen 2 and the movable molds Cma and Cmb), and that detects a relative distance with respect to the fixed platen 4 and thereby can detect the current position of the movable platen 2 (the movable molds Cma and Cmb). The mold position sensor 33 is connected to the sensor port of the controller main body 31.

On the other hand, the controller main body 31 incorporates hardware such as a microcomputer and an internal memory (internal storage means) $31m$ such as a hard disk, and has the computer function of performing various types of control and processing and the like. The internal memory $31m$ includes a data area $31md$ into which various types of data can be written and a program area $31mp$ in which various types of programs are stored.

Hence, in the program area $31mp$, various types of programs for performing various types of computation processing and various types of control processing (sequence control) are stored, and in particular, the programs include a mold attaching mode sequence control program for performing a mold attaching mode Mc used in the mold attaching method according to this embodiment. In this way, when the mold attaching mode Mc is selected, at least, the molding machine controller 10 limits a mold clamping force at the time of the attaching of the mold to a limited mold clamping force Pcp lower than a mold clamping force Pmax at the time of molding. In this case, the limited mold clamping force Pcp can be set to fall within a range of 5 to 25% of the maximum mold clamping force Pmax in the mold clamping device $1c$. By making the setting as described above, it is possible to clamp the mold with a pressurization force sufficiently lower than the maximum mold clamping force Pmax (100% output).

Furthermore, the illustrated embodiment provides the function of performing mask processing on a key display for performing high-pressure mold clamping displayed on the operation screen of the display 11 additionally provided in the molding machine controller 10 for driving and controlling the mold clamping device $1c$. In this way, an operation input is prohibited so that the high-pressure mold clamping is not performed from the side surface of the operation.

When the mold attaching mode Mc is selected, the molding machine controller 10 performs the function of preventing the limitation from being cancelled until all the clamp portions $5ma$, $5mb$, $5ca$ and $5cb$ are turned on, that is, an interlock function Fi. The interlock function Fi is the function of previously setting the number of all the clamp portions $5ma$, $5mb$, $5ca$ and $5cb$ at a setting value St, of counting the number of the clamp portions $5ma$, $5mb$, $5ca$ and $5cb$ that are turned on when the mold is attached and of cancelling the limitation, that is, completing the mold attaching mode Mc when the count value Sc counted reaches the setting value St. In the limitation, since the four clamp portions $5ma$, $5mb$, $5ca$ and $5cb$ are provided altogether, the setting value St is set at "4." As described above, the interlock function Fi is cancelled on condition that in the mold attaching mode Mc, the number of all the clamp portions $5ma$, $5mb$, $5ca$ and $5cb$ is previously set at the setting value St, the number of the clamp portions $5ma$, $5mb$, $5ca$ and $5cb$ that are turned on when the mold is attached is counted and the count value Sc counted reaches the setting value St.

The mold attaching method to the mold clamping device $1c$ according to this embodiment will then be described specifically with reference to FIGS. 1 to 7.

Figure 3:
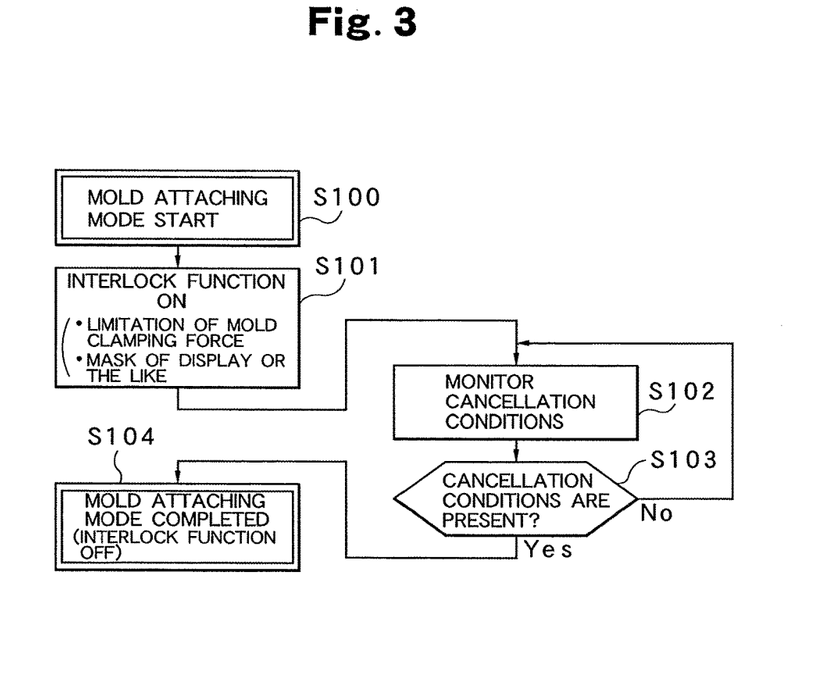
FIG. 3: A rough schematic diagram of the mold attaching method.

The outline of the mold attaching method according to this embodiment will first be described with reference to FIG. 3. In the mold attaching method according to this embodiment, when the mold is attached, the mold attaching mode Mc is performed, and the interlock function Fi is turned on (steps S100 and S101). On the other hand, while the mold attaching mode Mc is being performed, cancellation conditions for cancelling the interlock function Fi are monitored (step S102). In the cancellation conditions, on condition that all the molds Ca and Cb are securely fixed, that is, all the clamp portions 5*ma*, 5*mb*, 5*ca* and 5*cb* are turned on, the interlock function Fi is turned off and the mold attaching mode Mc is completed when the cancellation conditions are satisfied (steps S103 and S104).

Figure 1:
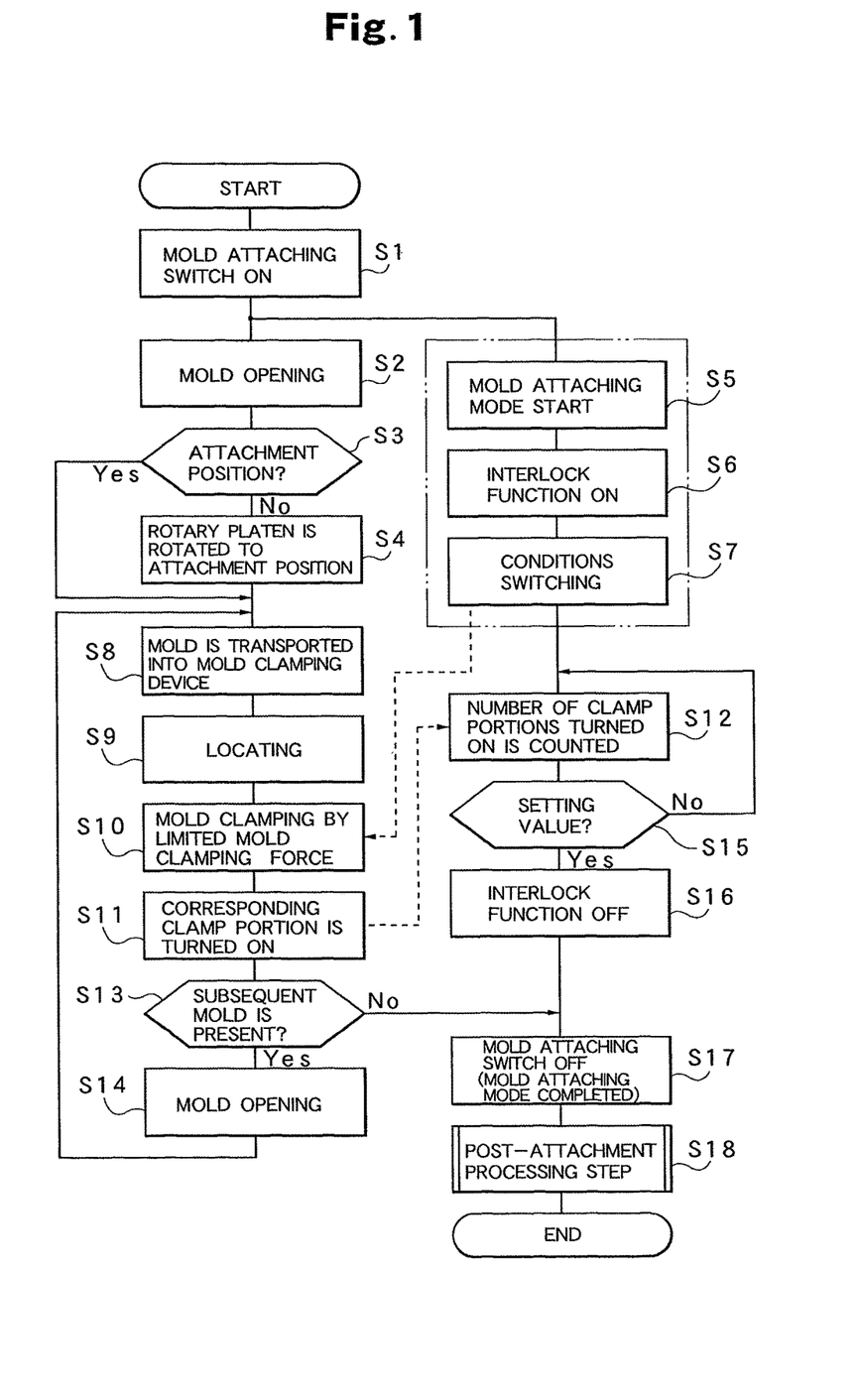
FIG. 1: A flowchart for sequentially illustrating an attaching procedure based on a mold attaching method according to a preferred embodiment of this invention.

The specific processing procedure of the mold attaching method will then be described with reference to a flowchart shown in FIG. 1.

Figure 6:
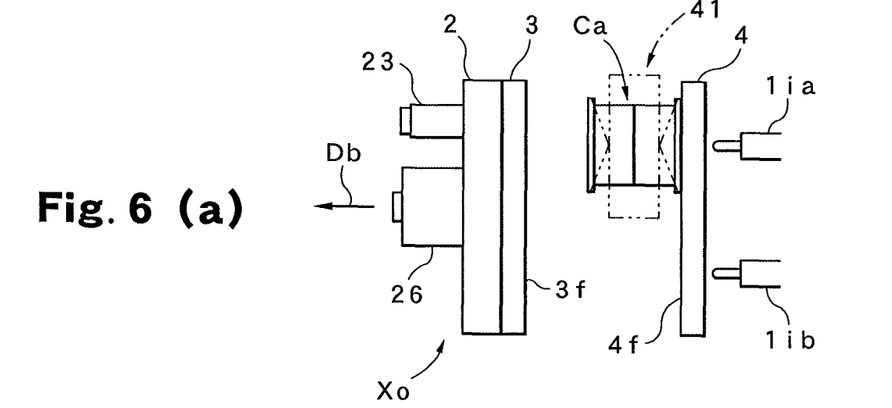

First when the molds Ca and Cb are attached, a mold attaching switch is turned on (step S1). Specifically, it can be performed by touching a "mold attaching start key" in the operation screen displayed on the display 11. In this way, in the mold clamping device 1*c*, the movable platen 2 is moved to a mold open position Xo as shown in FIG. 6(*a*) (step S2). In the embodiment, since the attachment position of the rotary platen 3 is set at a "left rotation limit", when the attachment position of the rotary platen 3 is not located at the "left rotation limit", the rotary platen 3 is rotated to the "left rotation limit" and is located at the attachment position (steps S3 and S4).

When the mold attaching switch is turned on, the mold attaching mode Mc of the molding machine controller 10 is started (step S5). The mold attaching mode Mc is started, and thus the interlock function Fi is turned on, and various types of condition switching based on the mold attaching mode Mc are performed (steps S6 and S7).

Specifically, as the various types of condition switching, the mold clamping force when the mold is attached is set at the limited mold clamping force Pcp lower than the maximum mold clamping force Pmax at the time of molding, more specifically, the limited mold clamping force Pep which is limited to fall within a range of 5 to 25% of the maximum mold clamping force Pmax in the mold clamping device 1*c* is set and the mold clamping force while the mold attaching mode Mc is being performed is limited to this limited mold clamping force Pcp. The limited mold clamping force Pcp described above is set, and thus the mold can be clamped with a pressurization force sufficiently lower than the maximum mold clamping force Pmax (100% output), with the result that the effect of reducing the application of excessive stress on the molds Ca and Cb and the mold clamping device 1*c* and furthermore, the effect of preventing the damage of the molds Ca and Cb and the mold clamping device 1*c* can be advantageously made more effective and reliable.

In addition, while the mold attaching mode Mc is being performed, the mask processing is performed on the key display for performing the high-pressure mold clamping displayed on the operation screen of the display 11. In this way, the user (operator) can easily know that the high-pressure mold clamping is limited and can prohibit the high-pressure mold clamping from the side surface of the operation, and thus it is advantageously possible to achieve a function as a so-called double limitation means for limiting the occurrence of a high-pressure mold clamping force.

On the one hand, the interlock function Fi is turned on, and thus the cancellation conditions are monitored as described previously and shown in FIG. 3 (step S102). Specifically, when the mold is attached, the function is performed that maintains the mold attaching mode Mc until the number of the clamp portions 5*ma*, 5*mb*, 5*ca* and 5*cb* that are turned on, is counted, and the count value Sc counted reaches the setting value St. In the embodiment, since the setting value St is set at "4", the interlock function Fi is cancelled on condition that the count value Sc reaches the setting value St. The interlock function Fi described above is provided, and thus it can be utilized as the most reliable information indicating that all the molds Ca and Cb are securely fixed, with the result that the effectiveness and the reliability of the interlock function Fi can be more enhanced. In addition, when the interlock function Fi is not cancelled even though a series of attaching steps in the mold attaching mode Mc are completed, this may mean that a failure may have occurred, and can be utilized as error information, for example, to execute a predetermined error processing such as the turning on of an alarm. When the mold attaching mode Mc is started, all the clamp portions 5*ma*, 5*mb*, 5*ca* and 5*cb* are controlled to be turned off, and the count value Sc is reset at "0."

On the other hand, a transport device 41 such as a hanging crane is utilized, and thus one set mold Ca is first (at first) transported into a space between the movable platen 2 and the fixed platen 4 in the mold clamping device 1*c* (step S8). Then, the mold Ca is set in a predetermined position, that is, a position that is tentatively located by an unillustrated tentative locating portion (step S9). This state is shown in FIG. 6(*a*). Then, the movable platen 2 is moved forward to close the mold, and the mold is clamped with the limited mold clamping force Pcp (step S10). This state is shown in FIG. 6(*b*). After the completion of the mold clamping, the clamp portions 5*ma* and 5*ca* corresponding to the transported mold Ca are turned on, that is, are brought into the clamp state (step S11). In this way, the fixed mold Cac of the mold Ca is fixed to the mold attachment surface 4*f* of the fixed platen 4, and the movable mold Cam is fixed to the mold attachment surface 3*f* of the rotary platen 3. Thus, the transport device 41 is separated from the mold Ca and is returned to a home position.

The molding machine controller 10 counts the number of the clamp portions 5*ma*, 5*mb*, 5*ca* and 5*cb* that are turned on when the mold is attached (step S12). At this point, since the two clamp portions 5*ma* and 5*ca* are turned on, the count value Sc is set at "2." In the detection of the turning on of the clamp portions 5*ma*, 5*mb*, 5*ca* and 5*cb*, any detection method may be used such as the detection of actual power supply to the clamp portions 5*ma*, 5*mb*, 5*ca* and 5*cb* or the detection of an instruction signal for turning on the clamp portions 5*ma*, 5*mb*, 5*ca* and 5*cb*.

Figure 7:
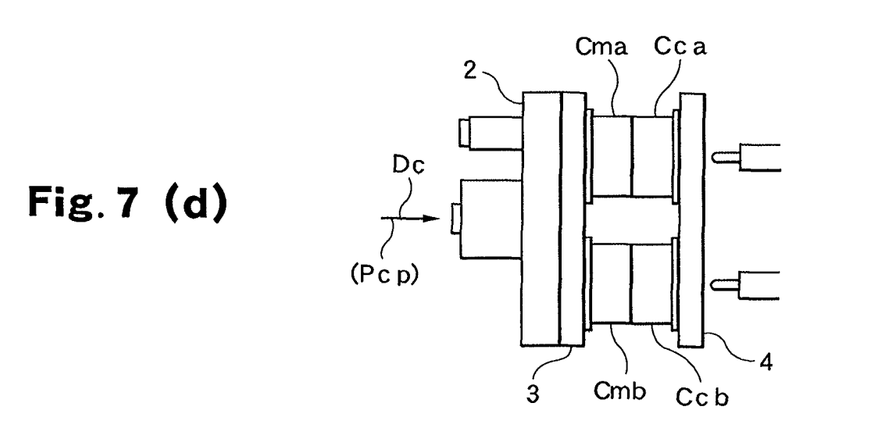

Thereafter, when the subsequently attached mold is left, the mold is attached by the same processing procedure. In the illustration, since the second mold Cb is left, the mold is attached by the same processing procedure (step S13). Since in this state, the mold is clamped, the mold is first opened to retreat the movable platen 2 (step S14). Then, the transport device 41 is utilized, and thus one set mold Cb that is transported secondly is transported into the space between the movable platen 2 and the fixed platen 4 in the mold clamping device 1*c* (step S8). Then, the mold Cb is set in the predetermined position, that is, the position that is tentatively located by the unillustrated tentative locating portion (step S9). This state is shown in FIG. 6(*c*). Then, the movable platen 2 is moved forward to close the mold, and the mold is clamped with the limited mold clamping force Pcp (step S10). This state is shown in FIG. 7(*d*). After the completion of the mold clamping, the clamp portions 5*mb* and 5*cb* corresponding to the transported mold Cb are turned on, that is, are brought into the clamp state (step S11). In this way, the fixed mold Cbc of the mold Cb is fixed to the mold attachment surface 4*f* of the fixed platen 4, and the movable mold Cbm is fixed to the mold attachment surface 3*f* of the rotary platen 3. Thus, the transport device 41 is separated from the mold Cb and is returned to the home position.

The molding machine controller 10 counts the number of the clamp portions 5*ma*, 5*mb*, 5*ca* and 5*cb* that are turned on when the mold is attached (step S12). At this point, since the two clamp portions 5*mb* and 5*cb* are further turned on, the count value Sc is set at "4." Consequently, all the clamp portions 5*ma*, 5*mb*, 5*ca* and 5*cb* are turned on, and the count value Sc reaches the setting value St of "4" (step S15). In other words, since the cancellation conditions are satisfied, the interlock function Fi is cancelled (step S16). In this way, since the attachment of the molds Ca and Cb is substantially completed, the mold attaching switch is turned off, and thus the mold attaching mode Mc is completed (step S17). What has been described above is the processing for attaching the molds Ca and Cb by the mold attaching method based on this embodiment. Thereafter, the process returns to a normal post-attachment processing step such as mold thickness reading on the molds Ca and Cb (step S18).

Figure 2:
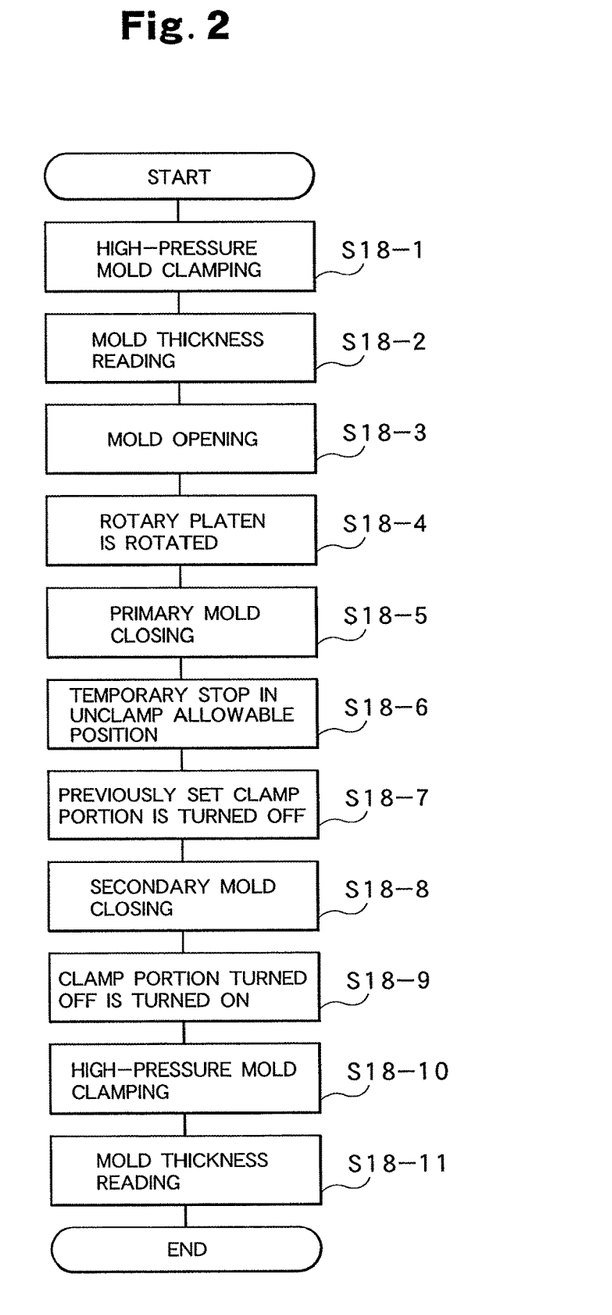
FIG. 2: A flowchart for sequentially illustrating the processing procedure of a post-attachment processing step that is performed after the mold is attached by the mold attaching method.

The outline of the post-attachment processing step will then be described with reference to a flowchart shown in FIG. 2.

By the completion of the mold attaching mode Mc (the interlock function Fi), the mold clamping device 1*c* is brought into a state where mold clamping using a high-pressure mold clamping force is allowed. Since the mold clamping device 1*c* is in a state where the mold is clamped by the limited mold clamping force Pcp at the completion of the mold attaching mode Mc described above, when the mold attaching mode Mc is completed and then the process returns to the post-attachment processing step, the limited mold clamping force Pcp is changed to the high-pressure mold clamping force. In this way, the high-pressure mold clamping using the high-pressure mold clamping force is performed, and the mold thickness reading processing after the high-pressure mold clamping is also performed (steps S18-1 and S18-2). Then, when the mold thickness reading processing is completed, the mold is opened to move the movable platen 2 to the mold open position Xo, and when the mold open position Xo is reached, as shown in FIG. 7(*e*), the rotary platen 3 is rotated 180° in the direction of an arrow Dr (steps S18-3 and 18-4). In this way, the positions of the movable molds Cma and Cmb are reversed, that is, the movable mold Cma on the primary side is moved to the position on the secondary side, and the movable mold Cmb on the secondary side is moved to the position on the primary side, with the result that the positions of the movable molds Cma and Cmb are interchanged.

Thereafter, a mold closing operation (primary mold closing) is performed to move the movable platen 2 from the mold open position Xo in a direction Dc in which the mold is closed (step S18-5). Then, as shown in FIG. 7(*f*), when the movable platen 2 (the movable molds Cmb and Cma) reaches a previously set unclamp allowable position Xs, a primary stop is performed (step S18-6). After the stop, the previously set clamp portions 5*mb* and 5*cb* are turned off, and the corresponding movable mold Cmb and fixed mold Ccb are brought into the clamp cancellation state (step S18-7). FIG. 7(*f*) schematically shows the clamp cancellation state of the clampers 5*mb* and 5*cb*.

Then, the mold closing operation is performed again, and secondary mold closing is performed that further moves the movable platen 2 from the cancellation setting position Xs in the direction Dc in which the mold is closed, and when the mold is closed, the mold closing operation is stopped (step S18-8). In this way, on the clamped fixed mold Cca, the clamp portion 5*mb* is turned off, and thus it is possible to locate the movable mold Cmb in the clamp cancellation state, and on the clamped movable mold Cma, the clamp portion 5*cb* is turned off, and thus it is possible to locate the fixed mold Ccb in the clamp cancellation state. Hence, in this state, the clamp portions 5*mb* and 5*cb* are turned on (step S18-9). Thereafter, the high-pressure mold clamping using the high-pressure mold clamping force is performed, and after the high-pressure mold clamping, the mold thickness reading is performed (steps S18-10 and S18-11). Then, the post-attachment processing step is completed.

Hence, in the mold attaching method according to this embodiment, since the mold clamping force when the mold is attached and clamped is limited to the limited mold clamping force Pcp lower than the mold clamping force at the time of molding, even when an unbalance is produced in the mold clamping force in a state where all of a plurality of sets of the molds Ca and Cb are not attached, it is possible to remove the application of unnecessary stress to the molds Ca and Cb and the mold clamping device 1*c*, and it is possible to prevent the breakage or damage of the molds Ca and Cb and the mold clamping device 1*c*. Consequently, a plurality of sets of the molds Ca and Cb can be attached set by set, and thus it is not necessary to provide a large-sized crane or the like having a special structure for supporting a plurality of sets, with the result that it is possible to significantly reduce costs related to facilities. Since at least, the mold clamping force when the mold is attached is limited to the limited mold clamping force Pcp, and the mold attaching mode Mc is set that has the interlock function Fi of preventing the limitation from being cancelled until the condition under which all the clamp portions 5*ma*, 5*mb*, 5*ca* and 5*cb* are turned on are satisfied, even when a plurality of sets of the molds Ca and Cb are attached set by set, it is possible to reliably remove a failure in which a high-pressure mold clamping force is applied by a normal operation or erroneously, and it is possible to remove a factor of anxiety for the user (operator) and smoothly and reliably perform the mold attaching, the position adjustment and the like, with the result that it is possible to facilitate the enhancement of the workability and the enhancement of the operation efficiency. In particular, the molds Ca and Cb include at least the mold in the multi-color molding injection molding machine 1, and thus it is possible to achieve the optimum performance given by the use of the mold attaching method according to this invention.

Although the preferred embodiment has been described above in detail, this invention is not limited to such an embodiment, and it is possible to arbitrarily make change, addition and deletion on the detailed configuration, the shape, the quantity, the method, the value and the like without departing from the spirit of this invention.

For example, although the case where the limited mold clamping force Pcp is set to fall within a range of 5 to 25% of the maximum mold clamping force Pmax in the mold clamping device 1*c* has been indicated, this is a guide, and basically, its magnitude can be set such that the mold clamping force is limited to the limited mold clamping force Pcp which corresponds to, for example, the form of the mold clamping device 1*c* and the molds Ca and Cb and which is lower than the mold clamping force at the time of molding. Although the case where the interlock function Fi is cancelled on condition that the number of all the clamp portions 5*ma*, 5*mb*, 5*ca* and 5*cb* is set at the setting value St, the number of the clamp portions 5*ma*, 5*mb*, 5*ca* and 5*cb* that are turned on when the mold is attached is counted and the count value Sc counted reaches the setting value St has been illustrated, other cancellation conditions, under which for example, a sensor for detecting the completion of the attaching of the movable molds Cma and Cmb and the fixed molds Cca and Ccb is additionally provided, and the results of the detection by the sensor are monitored, are not intended to be excluded. When the sensor is used, the movable molds Cma and Cmb and the fixed molds Cca and Ccb, the attachment of which has been completed, are detected by the sensor, and based on the results of the detection, it is possible to remove the interlock function. Although the case where, in the mold attaching mode Mc, the function of performing the mask processing on the key display for performing the high-pressure mold clamping displayed on the operation screen of the display 11 is provided, has been illustrated, it is not always necessary to provide it.

On the other hand, although in the embodiment, the case where as the molds Ca and Cb of the two-color molding injection molding machine 1, a pair of the movable molds Cma and Cmb and a pair of the fixed molds Cca and Ccb are provided has been illustrated, a type may be adopted in which a single movable mold Cm is provided for the pair of the fixed molds Cca and Ccb and the single movable mold Cm is used for each of the fixed molds Cca and Ccb (in general, a plurality of fixed molds Cca and so on) or a type (multi-color molding injection molding machine or the like) may be adopted in which three molds Ca, Cb and the like (three fixed molds Cca, Ccb and the like (in general, a plurality of fixed molds) and three movable molds (in general, a plurality of movable molds equal in number to the fixed molds)) are sequentially switched and used. The number of molds Ca and so on is arbitrary. Moreover, although in the embodiment, the case where the rotary platen 3 is arranged in the movable platen 2 has been indicated, it is not intended to exclude a case where the rotary platen 3 is arranged in the fixed platen 4. In this case, the fixed molds Cca and Ccb are clamped to the rotary platen 3, and the movable molds Cma and Cmb are clamped to the movable platen 2, and this type of embodiment is also included in this invention. Furthermore, the mold attaching method according to this invention can be performed by various forms, such as, a fully automatic operation, a semi-automatic operation or a manual operation and the like. Hence, it is possible to configure a flexible and optimum mold attaching method corresponding to the type of molds Ca and Cb, the type of injection molding machine 1 and the like, and thus it is possible to contribute to the enhancement of usability and convenience for the user. Although the case where the mold attachment surfaces 3f and 4f are perpendicular surfaces has been illustrated, as in a vertical molding machine or the like, they may be horizontal surfaces. In this case, the cancellation setting position Xs can likewise be performed such as by setting it at a position where the upper mold is close to the lower mold, and the position limitation pins 6 and the locating insertion holes 7 can be replaced by other locating means.

INDUSTRIAL APPLICABILITY

The mold attaching method to the mold clamping device according to this invention can be utilized for various types of injection molding machines such as the illustrated two-color molding injection molding machine and various types of production machines, such as an extrusion molding machine, that includes a mold and a mold clamping device.

REFERENCE SIGNS LIST

1: multi-color molding injection molding machine, 1c: mold clamping device, 2: movable platen, 3: rotary platen, 3f: mold attachment surface, 4: fixed platen, 4f: mold attachment surface, 5ma: clamp portion, 5mb: clamp portion, 5ca: clamp portion, 5cb: clamp portion, 10: molding machine controller, 11: display, Ca: mold, Cb: mold, Pcp: limited mold clamping force, Mc: mold attaching mode, Fi: interlock function

CITATION LIST

Patent Literature 1
JP-No. H5(1993)-185341
Patent Literature 2
International Publication No. WO2008/105034
Patent Literature 3
JP-No. 2013-188998

The invention claimed is:

1. A mold attaching method comprising the following steps:
    providing a mold clamping device including:
        a rotary platen having a predetermined number of clamp portions corresponding to a number of molds and a mold attachment surface;
        a movable platen supporting the mold attachment surface of the rotary platen; and
        a fixed platen having a mold attachment surface that is opposite to the mold attachment surface of the rotary platen and having a predetermined number of clamp portions corresponding to the number of molds,
    providing only a first mold between the movable platen and the fixed platen,
    exerting a mold clamping force to only the first mold that is limited to a limited mold clamping force lower than a mold clamping force at a time of molding,
    setting a mold attaching mode having an interlock function of preventing the mold clamping force from being cancelled until a condition under which all the clamp portions are actuated is satisfied, then
    providing a second mold between the movable platen and the fixed platen, and then
    exerting a mold clamping force to the second mold that is limited to the limited mold clamping force,
    wherein in the mold attaching mode, a number of all the clamp portions is previously set at a setting value, and the interlock function is cancelled on condition that a number of clamp portions which are turned on when the mold is attached, is counted, and that a count value counted reaches the setting value, wherein the setting value is greater than one,
    wherein after completing the mold attaching mode, performing post-attachment processing comprising the following steps:
        setting each of the clamp portions to a maximum mold clamping force,
        determining a thickness of the molds,
        performing a primary mold closing step for the molds,
        turning off at least one of the clamp portions,
        performing a secondary mold closing step for the molds,
        turning on the at least one clamp portion, and
        setting each of the clamp portions to the maximum mold clamping force, and
    wherein the limited mold clamping force is set within a range of 5 to 25% of the maximum mold clamping force to allow for the adjustability of the respective mold to ensure that the mold clamping force for each of the molds are balanced with respect to the other molds, and to allow for the removal of a mold that is improperly clamped.

2. The mold attaching method to a mold clamping device according to claim 1, wherein in the mold attaching mode, the mold attachment of which is completed is detected with a sensor, and based on a result of the detection, the interlock function is canceled.

3. The mold attaching method to a mold clamping device according to claim 1, wherein after completion of a plurality of attaching steps in the mold attaching mode, when the interlock function is not cancelled, error processing is performed.

4. The mold attaching method to a mold clamping device according to claim 1, wherein in the mold attaching mode, a mold clamping pressure is displayed on a key display for mold clamping, the key display being displayed on an operation screen.

5. The mold attaching method to a mold clamping device according to claim 1, wherein as the clamp portion, an electromagnetic clamper is used.

6. The mold attaching method to a mold clamping device according to claim 1, wherein as the clamp portion, a hydraulic clamper is used.

7. The mold attaching method to a mold clamping device according to claim 1, wherein as the clamp portion, an air clamper is used.

8. The mold attaching method to a mold clamping device according to claim 1, wherein as the clamp portion, a bolt and nut is used.

9. The mold attaching method to a mold clamping device according to claim 1, wherein the molds include at least a mold in a multi-color molding injection molding machine.

10. The mold attaching method to a mold clamping device according to claim 1, wherein the plurality of sets of molds include a plurality of movable molds and a plurality of fixed molds equal in number to the movable molds.

11. The mold attaching method to a mold clamping device according to claim 1, wherein the plurality of sets of molds include a single movable mold and a plurality of fixed molds.

12. The mold attaching method to a mold clamping device according to claim 1, wherein the mold attachment surfaces of the rotary platen and the fixed platen are vertical surfaces.

13. The mold attaching method to a mold clamping device according to claim 1, wherein the mold attachment surfaces of the rotary platen and the fixed platen are horizontal surfaces.

14. The mold attaching method to a mold clamping device according to claim 2, wherein after completion of a plurality of attaching steps in the mold attaching mode, when the interlock function is not cancelled, error processing is performed.

* * * * *